United States Patent [19]

Stäbler

[11] Patent Number: 4,577,526
[45] Date of Patent: Mar. 25, 1986

[54] PROTECTIVE ELEMENT FOR HAND-HELD POWER TOOL

[75] Inventor: Manfred Stäbler, Echterdingen, Fed. Rep. of Germany

[73] Assignee: Robert Bosch GmbH, Stuttgart, Fed. Rep. of Germany

[21] Appl. No.: 586,094

[22] Filed: Mar. 5, 1984

[30] Foreign Application Priority Data

Mar. 22, 1983 [DE] Fed. Rep. of Germany ... 8308464[U]

[51] Int. Cl.⁴ .......................... F16P 1/00; B24B 55/04
[52] U.S. Cl. ........................................ 74/609; 51/268; 403/146; 403/408.1
[58] Field of Search ..................... 74/609; 51/268, 269; 403/146, 148, 383, 408; 411/119, 120

[56] References Cited

U.S. PATENT DOCUMENTS 2,246,457 6/1941 Schultz ................................ 403/408
4,343,115 8/1982 Stäbler et al. .......................... 51/268

FOREIGN PATENT DOCUMENTS 127799 6/1919 United Kingdom ................ 411/119

Primary Examiner—Kenneth J. Dorner
Attorney, Agent, or Firm—Michael J. Striker

[57] ABSTRACT

A protective element for a hand-held power tool with a rotary tool, such as a grinding disk, a circular saw, or the like, has a protective member with cut-outs having increased portions, an additional member connectable with the protective member, and connecting elements for connecting the additional member to the protective member and including a plurality of holding screws having heads extending through the increased portions of the cut-outs and engageable behind the protective member, wherein the increased portions have the shape of the plan view of the screw heads and are provided at the same end of the elongated cut-outs, and a locking projection is provided near at least one increased portion in the path of the screw head of the screw sliding in the respective cut-outs.

8 Claims, 4 Drawing Figures

PROTECTIVE ELEMENT FOR HAND-HELD POWER TOOL

BACKGROUND OF THE INVENTION

The present invention relates to a protective element for hand-held power tool.

Protective elements of the above mentioned general type are known in the art. One such protective element is disclosed for example in DE-PS 2,216,990. The protective element shown in this reference has two elongated openings with increased portion for insertion of heads of holding screws. The holding screws extend through two guide slots in a guide carriage and can connect the guide carriage with the protective element. The distance of the guide slots and the distance of the increased portions of the longitudinal openings are different. Parts of the guide slots and the increased portions are brought into alignment with one another by rotation of the protective element relative to the guide carriage in the contact plane between the protective element and the guide carriage. In any other normal position of use, the screws extending through the guide slots and the longitudinal openings cannot be brought on the increased portions. The holding screws which engage through the longitudinal openings into the protective element and the guide slot into the guide carriage and hold the former with the latter together with the screwed wing nuts, can allow a displacement of the guide carriage relative to the protective member after slight release of the wing nuts. Because of the above described different distances, an undesirable release of the protective element from the guide carriage by simultaneous withdrawal of the head of the holding screw from the increased portions in the protective element is prevented with relatively high reliability. Only exactly determined relative position between the protective element and the guide carriage is required, in which the heads of both holding screws can extend through the increased portions in the protective elements. The disadvantage of this construction is the complicated mounting. First, the head of one holding screw must be inserted through one increased portion. Then, the holding screw must be displaced to another end of the longitudinal opening. Then, the guide carriage must be turned around the holding screw until the other holding screw has such a distance from the first holding screw that its head can be inserted through the associated increased portion. After this, the guide carriage is again turned to its working position in which the longitudinal slots of the carriage are directed substantially normal to the opening edge of the protective element. Thus the second holding screw moves into the second longitudinal opening.

In a protective element in accordance with the DE-GM 7,909,078, the increased portions for the heads of the holding screws are provided in the protective element, which in the lateral view of the shaft ends of the holding screws have a shape corresponding to the shape of the screw head. The holding screws can be turned only relative to its normal position by substantially 90° and brought through the increased portions. Here a turning movement of the screws is needed. It is also guaranteed that the protective element and the guide carriage during relative adjustment cannot be unintentionally loosened. In this construction, however, again a relatively expensive mounting is needed. Both the above constructions have the same feature that they require an exact mounting process. An operator who does not have special knowledge cannot recognize how he can assemble the guide carriage and the protective element with the aid of the screws.

SUMMARY OF THE INVENTION

Accordingly, it is an object of the present invention to provide a protective element for a hand-held power tool which avoids the disadvantages of the prior art.

More particularly, it is an object of the present invention to provide a protective element for a hand-held power tool which allows a person without prior knowledge by observation of its individual parts, such as a protective member, a guide carriage, holding screws, and the like, to recognize first how to assemble these parts.

In keeping with these objects and with others which will become apparent hereinafter, one feature of the present invention resides, briefly stated, in a protective element having a protective member and a guide carriage connectable by holding screws having heads extending through increased portions of slots and engaging behind the protective member, wherein the increased portions have the shape of the plan view of the head screws and are provided at the same end of the longitudinal cut-outs in the protective member, and at least one increased portion is associated with a locking projection provided on the wall of the protective member in the path of the head sliding on the protective member when the shaft of the screw slides in the cut-out.

The above mentioned projection cooperating with the head of the holding screw reliably secures the protective member and the guide carriage from unintentional loosening.

In accordance with another feature of the present invention, an axially acting pressure spring is arranged on the shaft of the holding screw, whose head cooperates with at least one locking projection.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
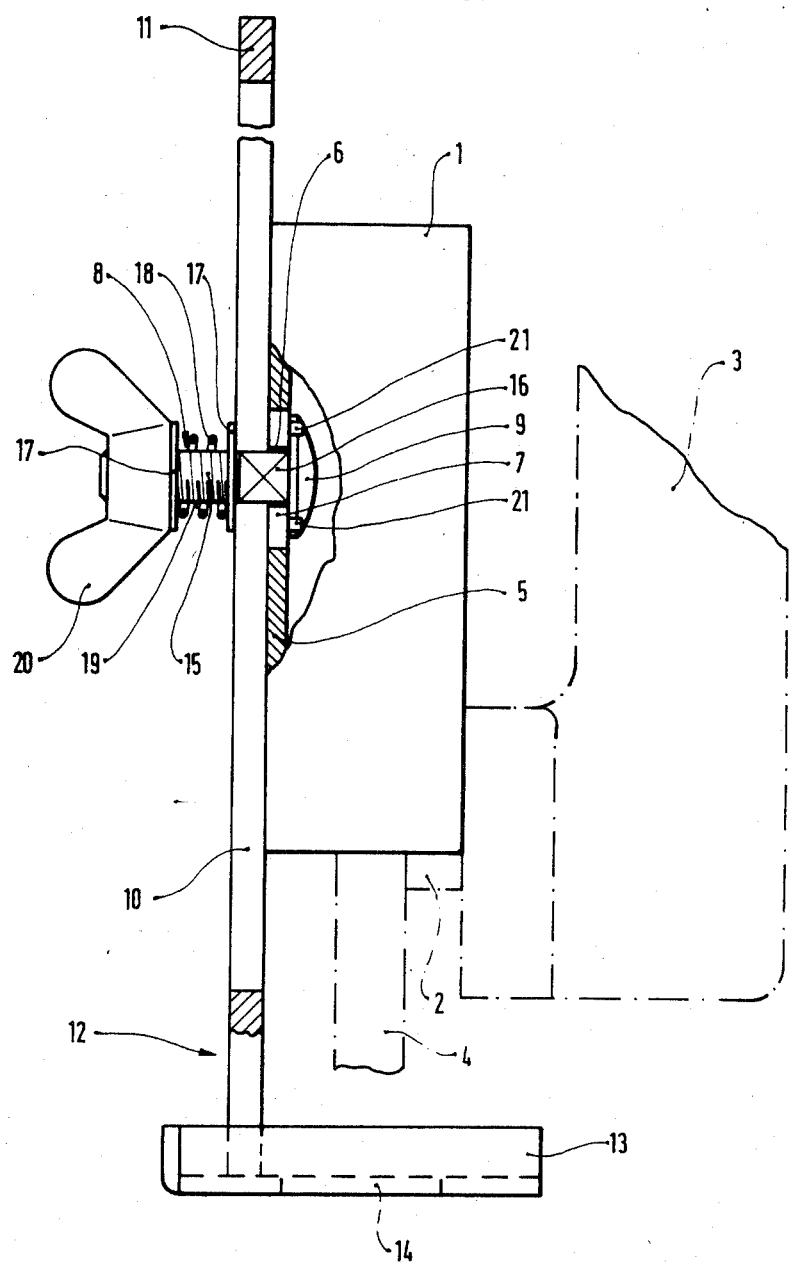
FIG. 1 is a side view of a protective element assembled with a guide carriage, partially sectioned.
Figure 2:
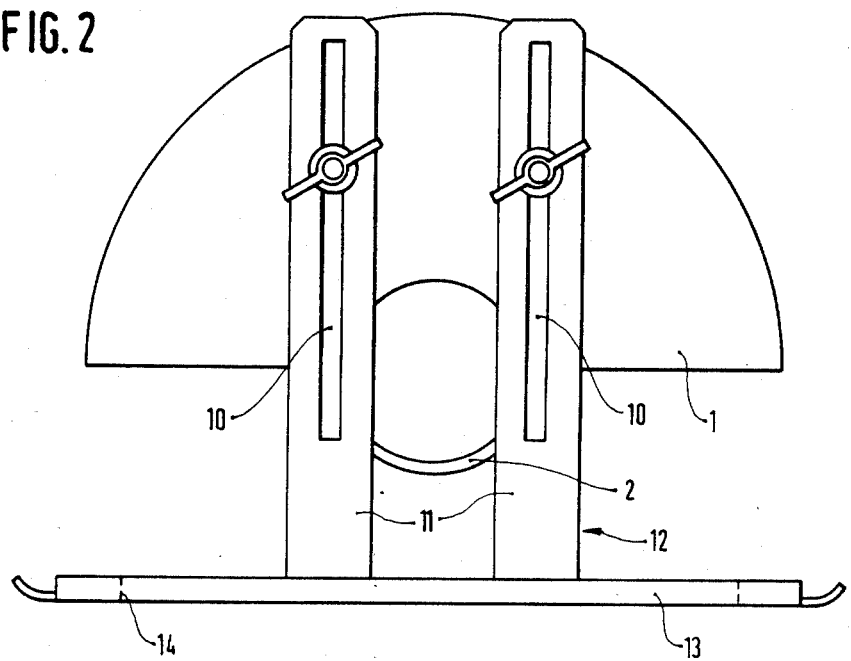
FIG. 2 is a front view of the protective element with the guide carriage of FIG. 1.
Figure 3:
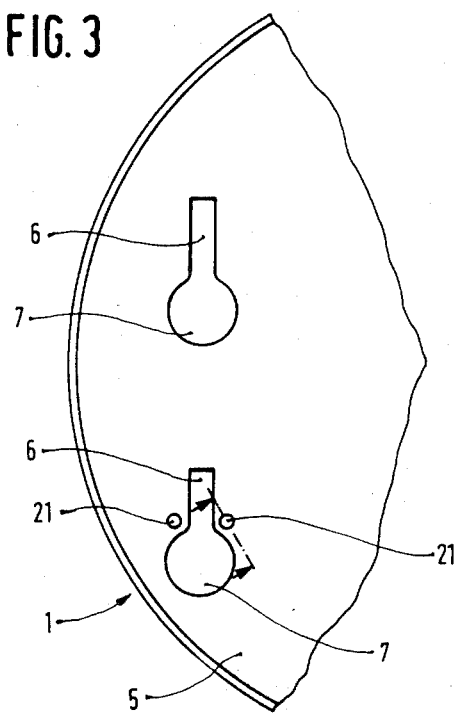
FIG. 3 is a view showing a portion of the protective element separated from the guide carriage.
Figure 4:
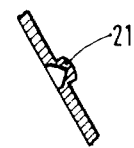
FIG. 4 is a view showing a fragment of the protective element of FIG. 3.

A protective element 1 cooperates with a holder 2 for an angular grinder 3. A grinding disk 4 is connected with the angular grinder 3. The protective element 1 has a wall 5 which faces away from the angular grinder 3 and is provided with elongated cut-outs 6 having increased portions 7.

The increased portions 7 have such a dimension and shape that holding screws 8 with their heads 9 can be inserted through the same normally. The center distance between the increased portions 7 from one another corresponds to the distance between two parallel longitudinal slots 10 in two bar-shaped holders 11 of a guide carriage 12. The holder 11 supports a support 13 of the guide carriage 12. The support 13 extends parallel to the axis of rotation of the grinding disk 4. It has a through-slot 14 for the grinding disk 4.

The holding screws 8 are provided at their shafts 15 with a four-cornered portion 16 whose width over flats is dimensioned so that it can slide through the cut-outs 6. Moreover, the shaft 15 of the holding screws 8 engages through the respectively associated longitudinal slot 10.

Two washers 17 and a pressure spring 18 are fitted on the shaft 15 of the holding screws 8, prior to screwing of a wing nut 20 onto its thread 19. Two locking projections 21 are associated with the respective increased portions 7. The head 9 of the associated holding screw 8 must be lifted over the respective projection 21, when the shaft 15 of the holding screw 8 must be displaced into the cut-out 6 from the increased portion 7.

As long as the head abuts behind the locking projection 21 on the outer surface of the wall 5, the holding screws 8 can displace only from the end of the cut-out 6 facing away from the increased portion until abutment of the head 9 of one holding screw 8 against the locking projection 21. When the operator applies no axial pressure via the wing nuts 20 onto the holding screws 8, the pressure spring 18 guarantees that the head 9 always abuts against the wall 5. The locking projections 21 provide for the desired safety.

For the predetermined use of the protective element 1 with the guide carriage 12 mounted thereon, it is also sufficient when the holding screws 8 are mounted without the pressure springs 18. The wing nuts 20 can be screwed so long on the holding screws 8, that they clamp the protective element 1 and the guide carriage 12 on one another. For adjusting the distance of the support 13 from the protective element 1, the ring nuts 20 are released until their clamping action is lifted. The thus produced axial play of the holding screws 8 is not sufficient to lift the head 9 over the locking projection 21, which together with these projections provide for reliable connection between the protective element 1 and the guide carriage 12.

It will be understood that each of the elements described above, or two or more together, may also find a useful application in other types of constructions differing from the types described above.

While the invention has been illustrated and described as embodied in a protective element for a hand-held power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A protective element for a hand-held power tool with a rotary tool, such as a grinding disk, a circular saw, or the like, comprising a protective member provided with a plurality of elongated cut-outs each having two ends spaced from one another in the direction of elongation and provided in one of said ends with an increased portion; an additional member connectable with said protective member; and means for connecting said additional member with said protecting member, said connecting means including a plurality of holding screws having heads arranged to be inserted from outside through said increased portions and engage behind said protective member, said increased portions of said cut-outs having a shape on a plan view which corresponds to the shape of said heads of said screws and being provided at the same ends of said cut-outs in said protective member, and at least one locking projection, which projects outwardly beyond said protective member and is arranged near at least one of said increased portions in a path of an associated one of said heads sliding on said protective member in a respective one of said cut-outs from said one end to said other end of each of said cut-outs and vice versa so that when the head of one of said holding screws is inserted through the increased portion of respective one of said cut-outs said head is located at one side of said locking projection, and after said head has been slid to the other end of the same cut-out said head is located at the other side of said locking projection.

2. A protective element as defined in claim 1, wherein said additional member is a guide carriage connectable with said protective member.

3. A protective element as defined in claim 1, wherein said protective member has a wall, said locking projection extends outwardly beyond said wall of said protective member.

4. A protective element as defined in claim 1, wherein each of said holding screws has a shaft; and further comprising a plurality of wing nuts each screwed on respective one of said holding screws, and a plurality of axially acting pressure springs each arranged between said shaft and said wing nut of a respective one of said screws.

5. A protective element as defined in claim 4, wherein said axially acting pressure springs are formed as helical springs.

6. A protective element as defined in claim 4; and further comprising a plurality of pairs of washers, the washers of each of said pairs being arranged on said shaft of each of said holding screws at both sides of said pressure spring.

7. A protective element as defined in claim 1, wherein said additional member is provided with at least two holders each having a longitudinal slot, said slots being spaced from one another and having a predetermined center distance therebetween, said increased portions of said cut-outs being spaced from one another and having a center distance therebetween corresponding to the center distance between said longitudinal slots of said holders of said additional member.

8. A protective element as defined in claim 1, wherein said cut-outs are elongated so as to allow also a pivotal movement of said protective member relative to said additional member.

* * * * *